Nov. 20, 1945.    R. B. McKINNIS    2,389,268
SYSTEM FOR CONTROLLING THE FLOW OF LIQUID INTO CONTAINERS
Filed Feb. 26, 1943    5 Sheets-Sheet 2

Inventor
RONALD B. McKINNIS

By Semmes, Keagin, Beale & Semmes
Attorneys.

Nov. 20, 1945.   R. B. McKINNIS   2,389,268
SYSTEM FOR CONTROLLING THE FLOW OF LIQUID INTO CONTAINERS
Filed Feb. 26, 1943   5 Sheets-Sheet 3

Inventor
RONALD B. McKINNIS
By Semmes, Keegin, Beale & Semmes
Attorneys

Nov. 20, 1945.
R. B. McKINNIS
2,389,268
SYSTEM FOR CONTROLLING THE FLOW OF LIQUID INTO CONTAINERS
Filed Feb. 26, 1943
5 Sheets-Sheet 5
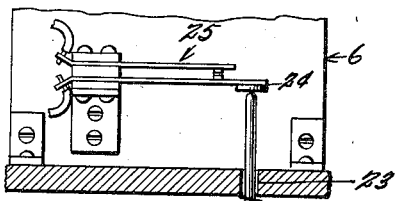
FIG. 7.
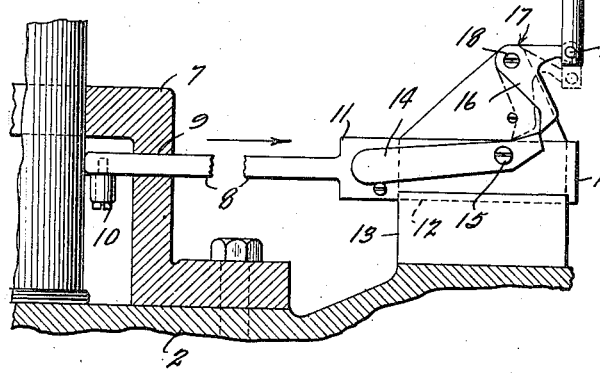
FIG. 6.
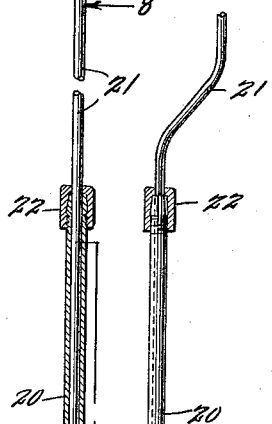
FIG. 8.
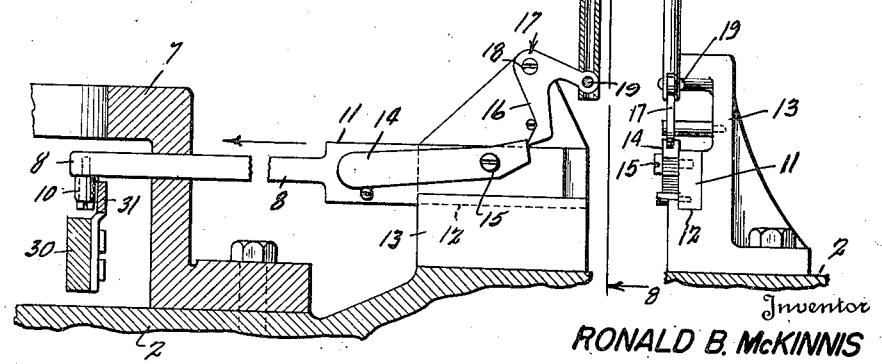
Inventor
RONALD B. McKINNIS
By Semmes, Keegin, Beale & Semmes
Attorneys Patented Nov. 20, 1945

2,389,268

UNITED STATES PATENT OFFICE 2,389,268

SYSTEM FOR CONTROLLING THE FLOW OF LIQUID INTO CONTAINERS

Ronald B. McKinnis, Winter Haven, Fla.

Application February 26, 1943, Serial No. 477,304

6 Claims. (Cl. 226—127)

The present invention relates to controlling the flow of liquids, and more particularly to a system for electrically controlling the rapid filling of containers with oxidizable liquids such as fruit and vegetable juices so that, after the desired amount of liquid has been introduced into the container, the introduction of the liquid will be arrested.

Heretofore, in filling containers with oxidizable liquids by means of an electric relay-controlled solenoid valve wherein the level of the liquid in the container controls the current flow to the relay, extreme difficulty has been encountered for preventing chattering of the relay. As a consequence, positive control of the flow of liquid cannot be effected. It is the customary practice with such filling methods to utilize such devices as a float operated switch or a pair of electrodes functioning with the surface of the liquid in the container to cause the relay to drop out, thereby closing the valve when the liquid in the container has attained a predetermined level.

Due to the surge of liquid flowing into the container, vibration of the filling machine and other causes, there will be a certain amount of turbulence and foaming of the liquid which means, of course, there will be a fluctuation of the surface level in the container. This surface fluctuation naturally results in the periodic making and breaking of the electrical contact to the relay which causes it to chatter with the consequent opening and closing of the filling valve. By virtue of this undesirable feature, it will be readily appreciated that accurate control of the liquid flow is practically impossible.

It is the purpose of the present invention to provide an electrically controlled filling system whereby the flow of liquid is positively shut off when the level of the liquid has reached a predetermined height in the container and the cycle cannot be started again until a subsequent container is in position for the filling operation.

The system is generally similar to that set forth in my copending application Serial No. 402,830, filed July 17, 1941. More specifically, this system embraces the concept of momentarily supplying electrical energy to actuate a relay controlling the flow of both purging fluid and oxidizable liquids, continuing to supply the current to the relay through a maintaining circuit and breaking the current to the maintaining circuit by the level of the liquid in the container whereby the flow of liquid to the container is completely arrested.

An object of my invention is to provide a system of electrically controlling the flow of liquid into a container; the liquid flow is arrested completely upon the desired volume of liquid being introduced into the container.

Another object of my invention is to provide a system for controlling the filling of juices into containers under conditions preventing atmospheric oxygen to the juice so that the flow of juice into the container will be stopped upon the juice attaining a predetermined level.

Yet a further object of the present invention is to provide an electrical control system for momentarily supplying electrical energy to initiate a flow of the current, continuing the flow of the current, and breaking the last-mentioned current supply when the liquid reaches a predetermined level in the container.

With these and other objects in view which may be incident to my improvements, the invention consists in the parts and combinations to be hereinafter set forth and claimed, with the understanding that the several necessary elements comprising my invention may be varied in construction, proportions and arrangements without departing from the spirit and scope of the appended claims.

In order to make my invention more clearly understood, I have shown in the accompanying drawings means for carrying the same into practical effect without limiting the improvements in their useful applications to the particular constructions which, for the purpose of explanation, have been made the subject of illustration.

Figure 6 is a sectional view taken along the line 6—6 of Figure 5 looking in the direction of the arrows.

Figure 7 is a sectional view taken along the line 7—7 of Figure 5 looking in the direction of the arrows.

Figure 8 is a sectional view taken along the line 8—8 of Figure 7 looking in the direction of the arrows.

Figure 1:
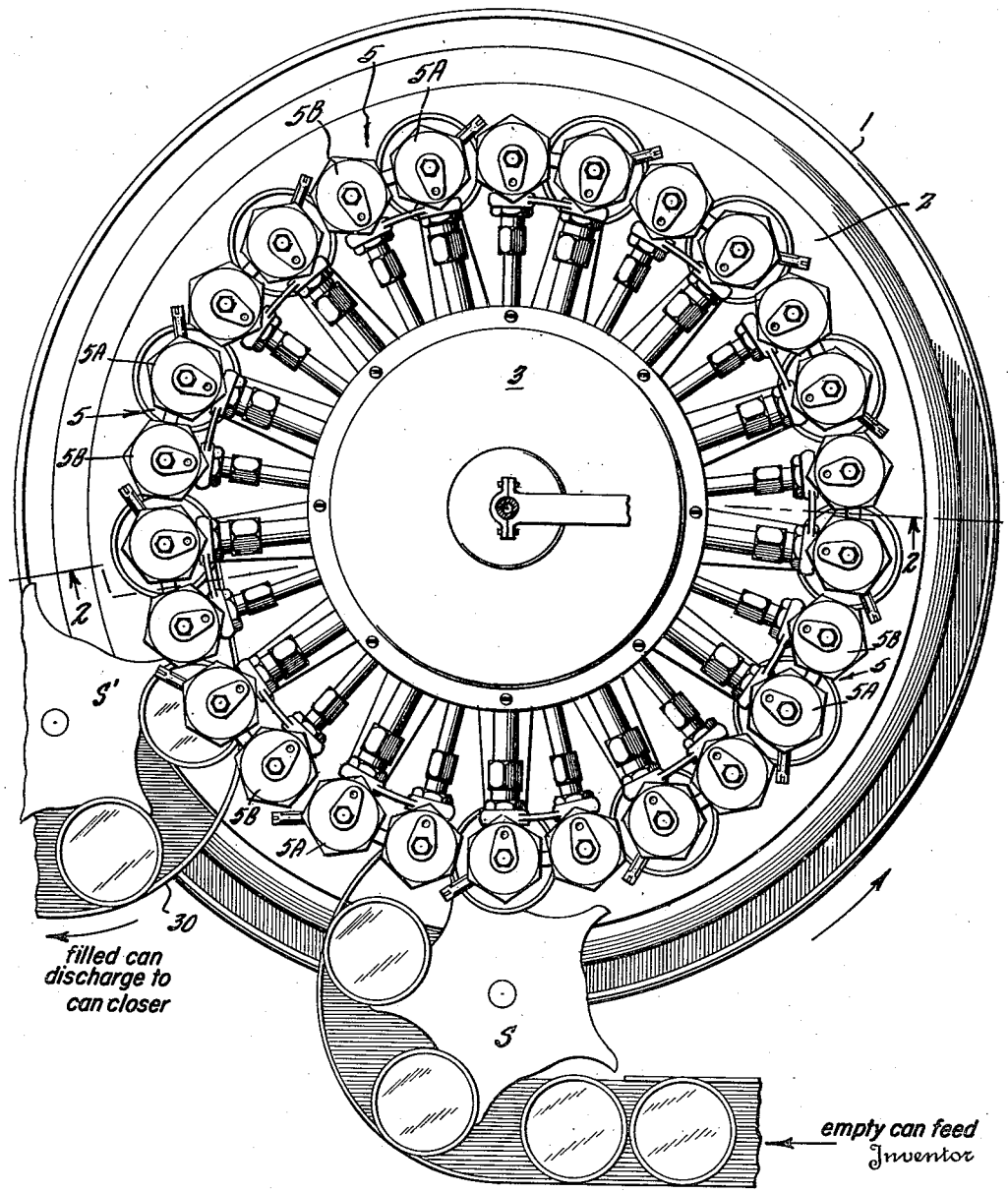
Figure 1 is a top plan view of the filling machine employed for carrying out my method showing in detail the mode by which the empty containers are introduced into the filling machine and the means by which they are removed after the filling operation.
Figure 2:
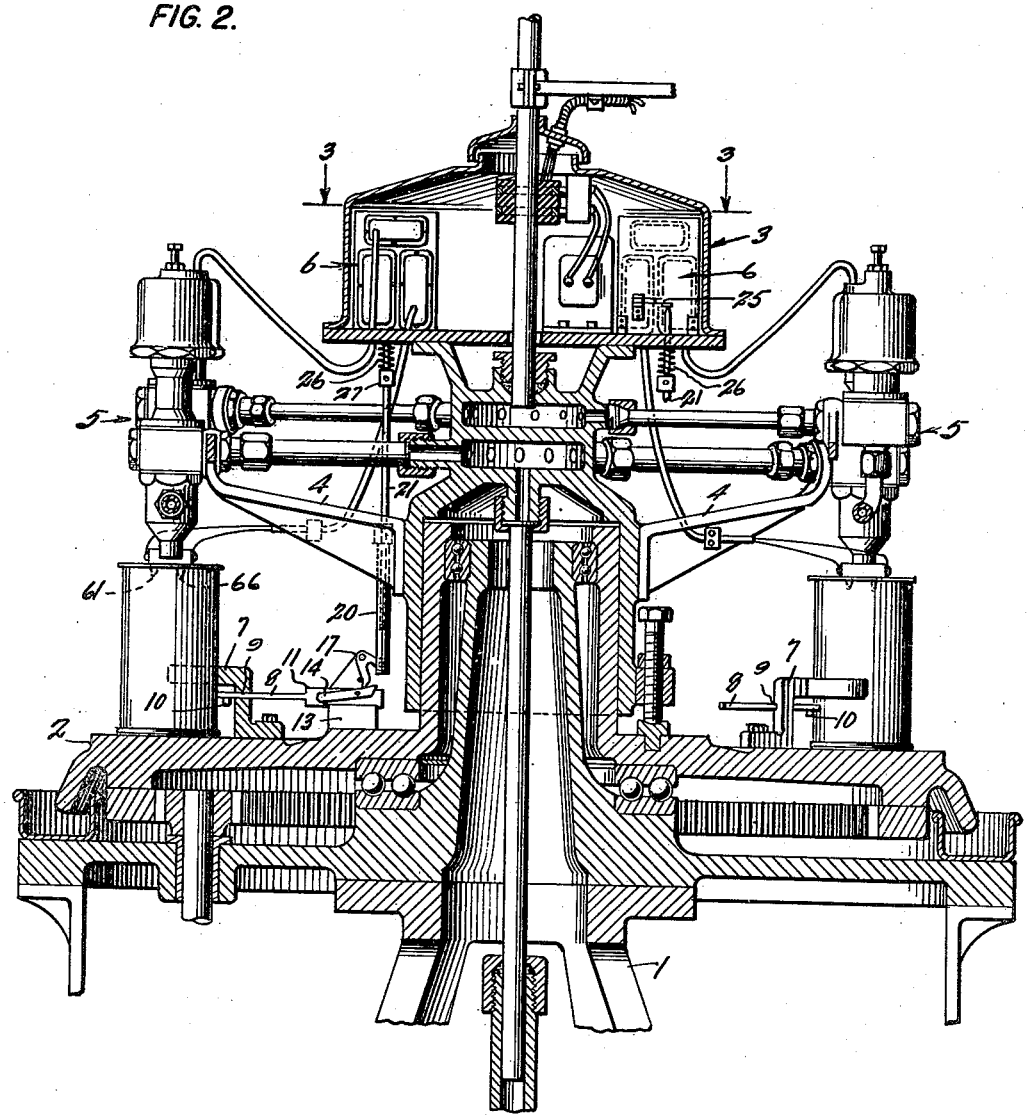
Figure 2 is a sectional view taken along the line 2—2 of Figure 1 looking in the direction of the arrows.
Figure 3:
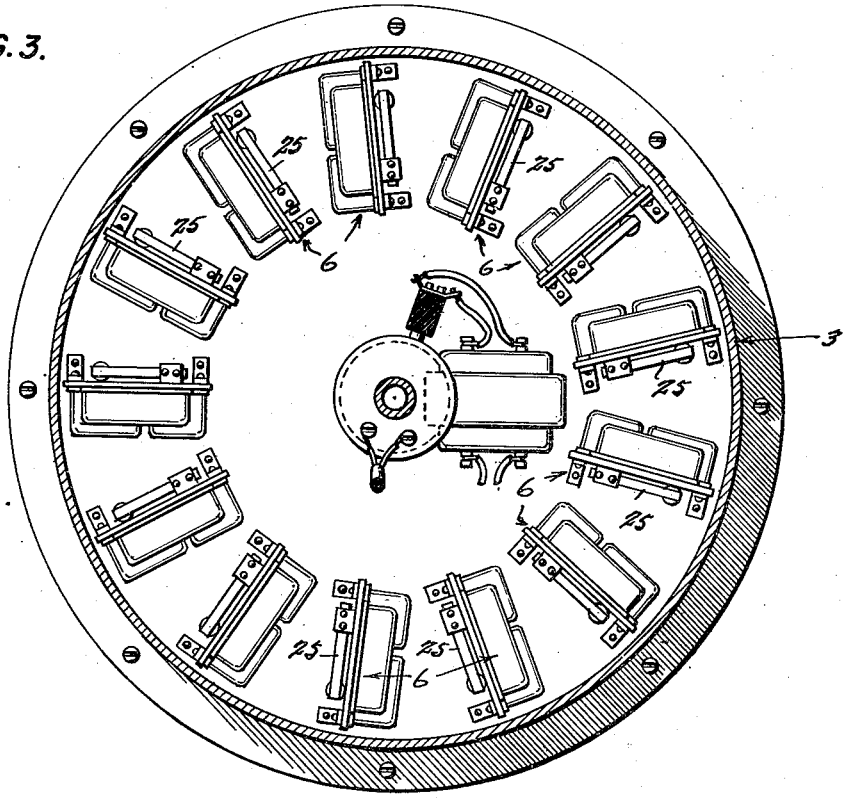
Figure 3 is a sectional view taken along the line 3—3 of Figure 2 looking in the direction of the arrows.

The filling machine illustrated in the present application is generally similar to that covered in my copending application Serial No. 402,830, filed July 17, 1941. In brief, it comprises a base 1 having rotatably mounted thereon a filling table 2 and telescoped on and rotatable with the table is a superstructure 3. Suppported suitably by the superstructure 3 by means of a bracket 4 is a plurality of valve assemblies 5. Each valve assembly 5 includes a valve for controlling the flow of the purging media such as inert gas, and a juice valve for admitting the juice or other oxidizable liquid into the container. These valves are so formed as to permit the juice to be introduced into the container surrounded by a protective blanket of gas. Control units 6 are also suitably supported within the superstructure 3. It should be mentioned that there is a valve unit 5 and a control unit 6 for each container that is adapted to be handled by the filling machine.

Figure 5:
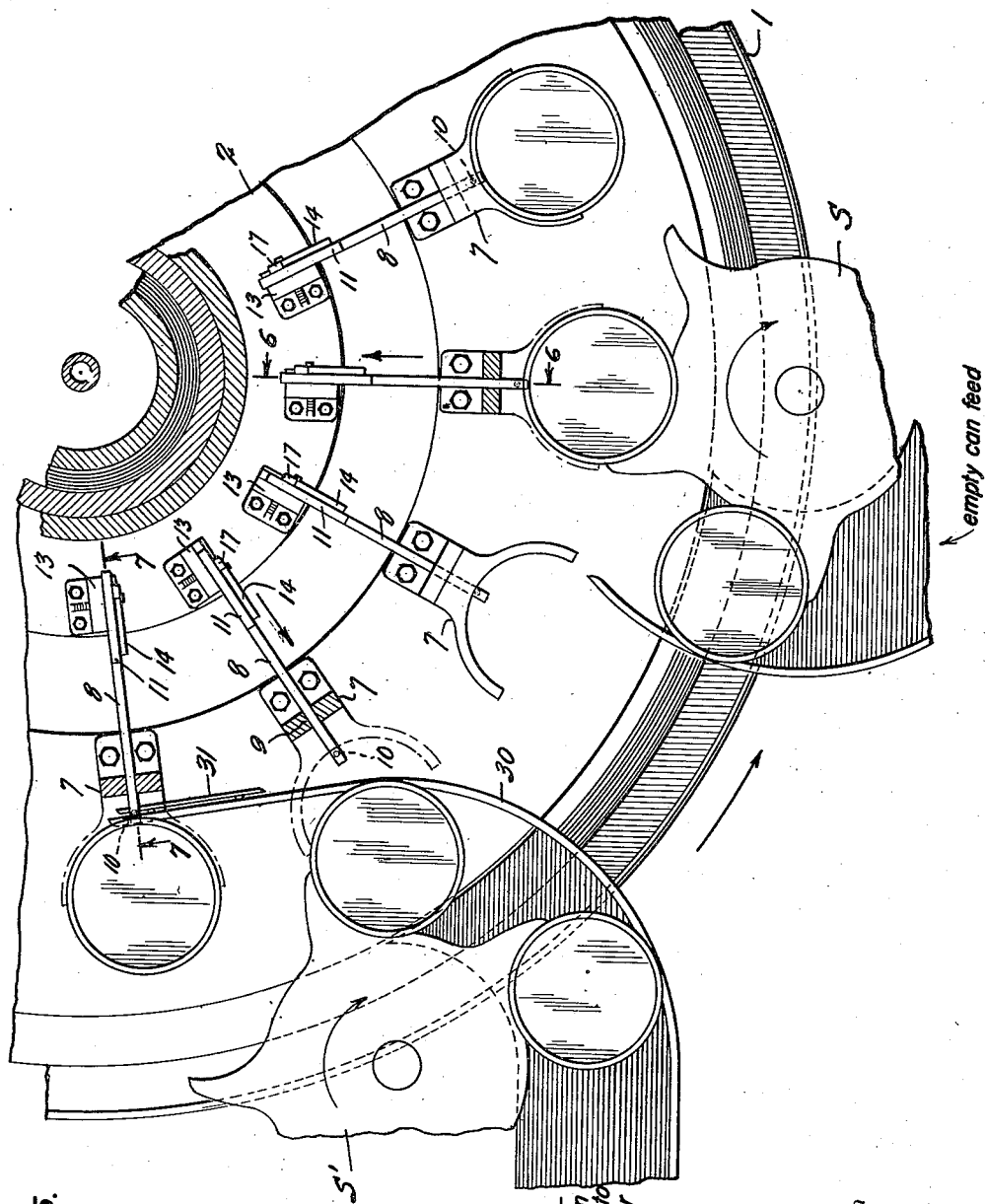
Figure 5 is a fragmental view partly in section showing the manner in which the starting switch is momentarily closed and also illustrating the means by which the switch is moved to the position to be actuated by an empty container.

Mounted on the table 2 are a plurality of yoke members 7, there being one yoke for each valve assembly 5. In Figures 5 and 6, it can be seen that the inner end of a horizontally extending rod 8 projects through an aperture 9 in the yoke 7. The rod 8 carries a cam follower 10, the purpose of which will hereinafter be more fully discussed. The opposite end of the rod 8 is enlarged as shown at 11 and it slides longitudinally in a groove 12 formed in a bracket 13 supported suitably on filling table 2 (Figure 8).

A counterweighted dog 14 is pivoted to one side of the rod 8 as indicated at 15. The dog 14 engages arm 16 of a bell crank 17, which is pivoted to the bracket 13 at the point 18. The other arm of the bell crank 17 is pivoted at 19 to the lower end of a tubular member 20. Telescoped within the tubular member 20 is a rod 21 that is clamped to the tubular member as shown at 22. The upper end of the rod 21 projects through an aperture 23 formed in the lower wall or base of the superstructure 3. The end of the rod 21 is adapted to contact spring arm 24 of a switch indicated generally 25. Surrounding the rod 21 immediately below the superstructure is helical spring 26. The upper end of the spring 26 contacts the lower wall of the superstructure 3 and the lower end bears against collar 27 carried by the rod 21 for normally maintaining the contacts of switch 25 open.

As the empty container moves by means of a star wheel S into the yoke 7, as shown in Figure 5, it pushes the rod 8 radially inward, as shown in Figure 6, and this movement causes the dog 14 to rotate the bell crank 17, thus imparting vertical movement to the tubular member 20 and hence to the rod 21. This vertical movement of the rod 21 causes closing of the contacts of the switch 25, thereby completing an electrical circuit. However, as the rod 8 nears the limit of its longitudinal travel, the dog 14 will ride under the end of the bell crank 17, thus permitting the spring 26 to move the rod 21 downwardly to its normal position, and this movement will, of course, open the contacts of the switch 25. Consequently, only a momentary or starting current is supplied to the electrical filling control to initiate a flow of purging fluid to the container. As will be described later, a separate circuit for maintaining the flow of purging fluid and also flow of juice is provided.

This arrangement, namely, the idea of momentarily supplying current to initiate the operation of the purging and juice valves is particularly important in that chattering of the control circuit is positively prevented. In other words, once the liquid reaches the desired level in the container the circuit is opened and no further liquid can be introduced into the container. The filled containers are then moved to a closing machine (not shown) by suitable conveying means as a star wheel S'.

After the container has been filled and the valves of the assemblies closed, it is engaged by a wiper 30 to remove the container from the filling machine. The wiper 30 carries a cam 31 which engages the cam follower 10 on the longitudinal rod 8 and moves the rod back to its radially extended position. This movement of the rod 8 will again bring the dog 14 behind the bell crank 17 in readiness for the next filling operation.

Figure 4:
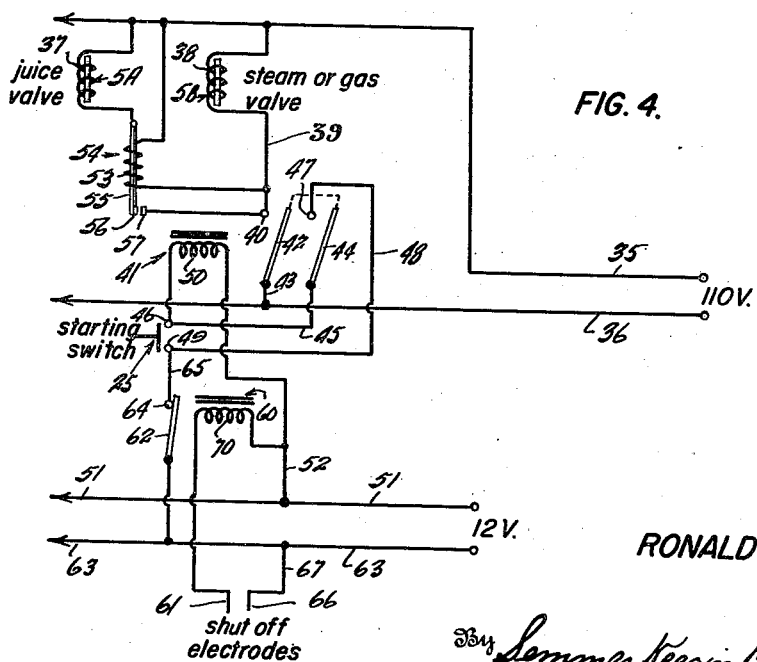
Figure 4 is a diagrammatic representation of the control circuit that is employed to carry out my inventive concept.

The electrical control circuit for operating my filling machine is best shown in Figure 4. It will be noted that leads 35 and 36 are connected to a source of 110 volt current. The lead 35 is connected to one end of the windings 37 and 38 of the juice and steam valve solenoid valves 5A and 5B respectively. The other end of the solenoid winding 38 is connected by a lead 39 to one contact point 40 of a double armature relay indicated generally 41. One armature 42 of relay 41 is adapted to make contact with the point 40 and is connected through lead 43 with the lead 36. The relay 41 under normal conditions is open. The other armature 44 of the relay 41 is connected by means of conductor 45 with one contact point 46 of the starting switch 25. Winding 50 of the relay 41 is connected between the contact point 46 of the switch 26 and a lead 51 extending to a source of low potential such as a 12-volt line through a conductor 52.

Connected between the leads 39 and 35 is the resistance winding 53 of a thermal switch 54, the by-metal contact strip 55 of which is connected at one end to the solenoid winding 37. The opposite end of the strip 55 carries a contact point 56 which is adapted to make contact with point 57 connected to the contact point 40 of the relay 41.

A normally closed relay 60 has one end of its winding 70 connected to the lead 52 and the opposite end thereof is connected to a shut-off electrode 61. Armature 62 of the relay 60 is connected to the other lead 63 of the low potential line and the armature is adapted to contact a contact point 64. The contact point 64 is connected through line 65 with the other contact point 49 of the starting switch 25. A second shut-off electrode 66 is connected by a line 67 with lead 63.

In operation, when the starting switch 25 is momentarily closed by a container moving onto the filling table and engaging the rod 8, current is supplied to relay 41 through lead 63, closed relay 60, starting switch 25, winding 50 of relay 41 and lead 52 back to lead 51. This effects the energization of the winding 50 and causes the relay 41 to close. Current then flows from the 110 volt line through lead 36, armature 42, conductor 39, through solenoid winding 38 and the lead 35 which opens the steam valve and supplies purging fluid to the interior of the container. Current also flows to the heating element 53 of the thermal switch 54. Upon the expiration of a predetermined period of time which is controlled by the adjustment of the thermal switch 54, contact is made between the points 56 and 57 thus energizing solenoid winding 37 to open the juice valve enabling the juice to be introduced into the container.

In view of the fact that the starting switch 25 is only momentarily closed by virtue of the structure hereinbefore described, operating current is maintained to the juice and steam solenoids 37 and 38 through the armature 44 of relay 41 to keep this relay closed until the proper amount of juice has been introduced into the container. When the container has been filled, the body of the juice therein bridges the shut-off electrodes 61 and 66 to energize winding 70 of the relay 60 which causes this relay to drop out and break the circuit to the relay 41. This, of course, de-energizes the solenoids 37 and 38 and effects closing of the respective valves.

It will be appreciated that I have provided an electrical control system for initiating the flow of a liquid and continuing such flow until the body of the liquid in the container attains a predetermined level, at which time the supply of the liquid is arrested automatically. The idea of momentarily supplying electrical energy to initiate the flow of the liquid, continuing to supply current through a maintaining circuit, and breaking the maintaining circuit through the level of the liquid in the container is particularly efficacious in that chattering of the control circuit is prevented and positive control of the filling valves is effected.

While I have shown and described the preferred embodiment of my invention, I wish it to be understood that I do not confine myself to the precise details herein set forth by way of illustration, as it is apparent that many changes and variations may be made therein, by those skilled in the art, without departing from the spirit of the invention, or exceeding the scope of the appended claims.

I claim:

1. A system for controlling the filling of oxidizable liquid into a container under non-oxidizing conditions comprising an electrically opened valve for the liquid and an electrically opened valve for an inert gas, a normally open relay for supplying current when closed to open the gas valve, delayed action means operable upon closing of the relay to supply current to open the liquid valve, circuit closing means momentarily operated by movement of the container to filling position to complete an electric circuit to initially close the relay, supplementary circuit closing means for maintaining the relay closing circuit, and circuit breaking means for opening the relay closing circuit to allow the valves to close.

2. A system for controlling the filling of oxidizable liquid into a container under non-oxidizing conditions comprising an electrically opened valve for the liquid and an electrically opened valve for an inert gas, a normally open relay for supplying current when closed to open the gas valve, delayed action means operable upon closing of the relay to supply current to open the liquid valve, circuit closing means momentarily operative by movement of a container to filling position to complete an electric circuit to initially close the relay, supplementary circuit closing means for maintaining the relay closing circuit, and circuit breaking means associated with the supplementary circuit closing means and adapted to be actuated by the liquid at a predetermined level in the container to cause the supplementary means to become inoperative to allow the valves to close when the liquid in the container has reached said predetermined level.

3. A system for controlling the filling of oxidizable liquid into a container under non-oxidizing conditions comprising an electrically opened valve for the liquid and an electrically opened valve for an inert gas, a normally open relay for supplying current when closed to open the gas valve, thermal switch means operable upon closing of the relay to supply current to open the liquid valve, circuit closing means momentarily operated by movement of the container to filling position to complete an electric circuit to initially close the relay, supplementary circuit closing means for maintaining the relay closing circuit, and circuit breaking means associated with the supplementary circuit closing means and adapted to be actuated by the liquid at a predetermined level in the container to cause the supplementary means to become inoperative to allow the valves to close when the liquid in the container has reached said predetermined level.

4. A system for controlling the filling of oxidizable liquid into a container under non-oxidizing conditions comprising an electrically opened valve for the liquid and an electrically opened valve for an inert gas, a normally open relay for supplying current when closed to open the gas valve, delayed action means operable upon closing of the relay to supply current to open the liquid valve, circuit closing means momentarily operative by movement of a container to filling position to complete an electric circuit to initially close the relay, supplementary circuit closing means for maintaining the relay closing circuit, a normally closed relay in the relay closing circuit, and means including electrodes adapted to complete an electrical circuit by contact of liquid in the container to open said normally closed relay to render the relay closing circuit inoperative and thereby allow the valves to close.

5. A system for controlling the filling of oxidizable liquid into a container under non-oxidizing conditions comprising an electrically opened valve for the liquid and an electrically opened valve for an inert gas, a normally open relay for supplying current when closed to open the gas valve, a thermal switch operable upon closing of the relay to supply current to open the liquid valve, circuit closing means momentarily operative by movement of a container to filling position to complete an electric circuit to initially close the relay, supplementary circuit closing means for maintaining the relay closing circuit, and circuit breaking means for opening the relay closing circuit to allow the valves to close.

6. A system for controlling the filling of oxidizable liquid into a container under non-oxidizing conditions comprising an electrically opened valve for the liquid and an electrically opened valve for an inert gas, said valves having an electric power circuit therefor including a normally open relay adapted to close to complete the power circuit to open the gas valve, a circuit closing switch operative by movement of a container to filling position to momentarily complete an electric circuit to initially close the relay, a supplementary switch adapted to be closed by the relay for maintaining the second mentioned circuit, a delayed action switch closed by the relay a predetermined time after the closing thereof for completing the power circuit to close the liquid valve, a normally closed relay associated with the supplementary switch, and electrode means cooperative with the liquid when the liquid has reached a predetermined level in the container to open the normally closed relay to break the second mentioned circuit and allow the valves to close.

RONALD B. McKINNIS.